(12) United States Patent
Anderson

(10) Patent No.: US 9,585,302 B2
(45) Date of Patent: Mar. 7, 2017

(54) CLOSING ASSEMBLY FOR AN AGRICULTURAL IMPLEMENT

(71) Applicant: CNH Industrial America LLC, New Holland, PA (US)

(72) Inventor: Brian John Anderson, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 219 days.

(21) Appl. No.: 14/500,405

(22) Filed: Sep. 29, 2014

(65) Prior Publication Data

US 2016/0088790 A1   Mar. 31, 2016

(51) Int. Cl.
*A01C 5/06* (2006.01)
*A01B 35/28* (2006.01)

(52) U.S. Cl.
CPC .............. *A01C 5/066* (2013.01); *A01B 35/28* (2013.01)

(58) Field of Classification Search
CPC ................................ A01C 5/066; A01B 35/28
USPC ........................................................ 172/603
See application file for complete search history.

(56) References Cited

U.S. PATENT DOCUMENTS

| | | | | |
|---|---|---|---|---|
| 1,042,651 A | * | 10/1912 | Davis et al. ........... | A01B 15/18 172/603 |
| 2,244,774 A | * | 6/1941 | Hewitt ................... | A01B 15/18 172/603 |
| 4,307,674 A | * | 12/1981 | Jennings ................ | A01C 5/068 111/136 |
| 4,377,979 A | | 3/1983 | Peterson et al. | |
| 4,404,918 A | * | 9/1983 | Whalen ................. | A01C 5/068 111/137 |
| 4,895,086 A | | 1/1990 | Tye | |
| 5,341,754 A | | 8/1994 | Winterton | |
| 5,461,995 A | | 10/1995 | Winterton | |
| 5,511,498 A | * | 4/1996 | Lohrentz ............... | A01C 5/066 111/191 |
| 5,562,054 A | | 10/1996 | Ryan | |
| 5,782,307 A | * | 7/1998 | Forsyth ................ | A01C 23/025 172/156 |

(Continued)

OTHER PUBLICATIONS http://www.carrotech.co.za/products/strip-till; 2013; 11 pages.

(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A row unit for an agricultural implement includes a closing disc configured to move soil into a trench. The row unit includes a first arm having a first end coupled to a center portion of a coupling and a second end configured to rotatably couple to a support structure of the row unit. A second arm includes a first end coupled to an outer portion of the coupling and a second end configured to rotatably couple to the support structure. The outer portion of the coupling is rotatable relative to the center portion, and rotation of the outer portion relative to the center portion drives a rotational axis of the closing disc to revolve about a longitudinal axis of the center portion to enable the closing disc to maintain a desired toe angle relative or a desired camber angle as the row unit travels across a field.

13 Claims, 6 Drawing Sheets

(56) References Cited

U.S. PATENT DOCUMENTS

| | | | |
|---|---|---|---|
| 5,957,217 A * | 9/1999 | Gunnink | A01B 35/16 172/166 |
| 6,119,608 A | 9/2000 | Peterson et al. | |
| 6,135,037 A | 10/2000 | Juptner | |
| 6,253,692 B1 | 7/2001 | Wendling et al. | |
| 6,314,897 B1 | 11/2001 | Hagny | |
| 6,454,019 B1 | 9/2002 | Prairie et al. | |
| 6,530,334 B2 | 3/2003 | Hagny | |
| 6,575,104 B2 | 6/2003 | Brummelhuis | |
| 6,578,502 B1 * | 6/2003 | Barnstable | A01B 35/16 111/164 |
| 6,848,377 B2 | 2/2005 | Rylander et al. | |
| 7,392,754 B2 | 7/2008 | Flikkema et al. | |
| 7,401,561 B1 | 7/2008 | Kurz | |
| 7,438,006 B2 | 10/2008 | Mariman et al. | |
| 7,451,712 B2 | 11/2008 | Bassett et al. | |
| 7,644,670 B2 | 1/2010 | Martin | |
| 7,665,539 B2 | 2/2010 | Bassett et al. | |
| 7,669,536 B2 | 3/2010 | Martin | |
| 7,743,718 B2 | 6/2010 | Bassett | |
| 7,975,629 B1 * | 7/2011 | Martin | A01C 5/066 111/140 |
| 8,006,775 B2 | 8/2011 | Steinlage et al. | |
| 8,151,717 B2 | 4/2012 | Bassett | |
| 8,267,021 B2 | 9/2012 | Mariman et al. | |
| 8,393,407 B2 | 3/2013 | Freed | |
| 8,505,473 B1 | 8/2013 | Martin | |
| 8,863,857 B2 | 10/2014 | Bassett | |
| 9,320,191 B2 * | 4/2016 | Patwardhan | A01C 5/066 |
| 2012/0186503 A1 | 7/2012 | Sauder et al. | |
| 2012/0210920 A1 | 8/2012 | Bassett | |
| 2012/0255475 A1 | 10/2012 | Mariman et al. | |
| 2013/0206431 A1 | 8/2013 | Freed | |
| 2014/0034344 A1 | 2/2014 | Bassett | |
| 2014/0216771 A1 | 8/2014 | Bassett | |
| 2014/0224513 A1 | 8/2014 | Van Buskirk et al. | |
| 2015/0359162 A1 * | 12/2015 | Needham | A01C 5/068 172/1 |

OTHER PUBLICATIONS http://www.kinze.com/filesimages/Literature/13182_Kinze.Planters.2014.pdf; Kinze Planters brochure; Kinze Manufacturing, Inc.; 2013; pp. 1, 6.

* cited by examiner

CLOSING ASSEMBLY FOR AN AGRICULTURAL IMPLEMENT

BACKGROUND

The invention relates generally to agricultural implements, and more particularly, to a closing system for a planter or a similar agricultural implement.

BRIEF DESCRIPTION

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. The opener is followed by closing discs that move the soil back into the trench and or a packer wheel that packs the soil on top of the deposited seeds.In typical planters, the closing discs are mounted on an arm that is pivotably coupled to a frame of the row unit. In such cases, various angular relationships between the closing discs and the soil change as the row unit traverses uneven surfaces in the field. Accordingly, disruptions in the soil may negatively affect the consistency with which the closing discs direct soil into the trench to cover the deposited seeds. As a result, seed coverage may be uneven, which may cause undesirable growing conditions for the seeds, thereby reducing overall yield.

SUMMARY OF THE INVENTION

In one embodiment, a row unit for an agricultural implement includes at least one closing disc configured to move soil into a trench. The row unit also includes a coupling configured to support the at least one closing disc, a first arm, and a second arm. The first arm includes a first end coupled to a center portion of the coupling and a second end configured to rotatably couple to a support structure of the row unit. The second arm includes a first end coupled to an outer portion of the coupling and a second end configured to rotatably couple to the support structure of the row unit. The outer portion of the coupling is rotatable relative to the center portion of the coupling. Rotation of the outer portion relative to the center portion drives a rotational axis of the at least one closing disc to revolve about a longitudinal axis of the center portion to enable the at least one closing disc to maintain a desired toe angle relative to a direction of travel or a desired camber angle relative to a surface of the soil as the row unit travels across a field.

In one embodiment, a row unit for an agricultural implement includes a support structure and a closing disc coupled to the support structure. The closing disc is configured to be positioned aft of an opener disc and to move soil into a trench formed by the opener disc as the agricultural implement travels across a field. The row unit also includes a linkage assembly coupled to the support structure. The linkage assembly includes a coupling having a center portion and an outer portion, a plurality of support arms extending between the support structure and the coupling, and an angled disc mounting shaft extending laterally outward from the outer portion of the coupling at an angle relative to a longitudinal axis of the coupling. The closing disc is rotatably mounted on the angled disc mounting shaft, and the outer portion and the angled disc mounting shaft are configured to rotate relative to the center portion of the coupling to maintain a desired angular relationship between the closing disc and a surface of the soil as the agricultural implement travels across a field.

In one embodiment, a row unit for an agricultural implement includes a support structure configured to be coupled to a frame of the row unit. The row unit includes a closing assembly having a coupling with a center portion and an outer portion. The closing assembly also includes a closing disc configured to move soil into a trench, and the closing disc is supported by the outer portion of the coupling and is oriented at an angle relative to a longitudinal axis of the center portion of the coupling. The closing assembly also includes a first support arm extending between the support structure and the center portion of the coupling and a second support arm extending between the support structure and the outer portion. The outer portion is configured to rotate relative to the center portion in response to movement of the closing disc vertically upward away from a surface of a field to maintain the angle between the closing disc and the longitudinal axis of the center portion of the coupling.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments disclosed herein include a closing assembly for a row unit of an agricultural implement, such as a planter. The agricultural implement includes one or more row units extending across a width of the agricultural implement, and each of the one or more row units includes a frame configured to support a closing assembly. The closing assembly of each of the one or more row units has one or more closing discs for moving soil into a trench to cover seeds deposited therein. In the disclosed embodiments, the closing assembly is mounted to the frame of the row unit via a linkage (e.g., multiple arms). The linkage enables the closing discs to be toed outwardly (e.g., oriented at a toe angle) relative to a direction of travel of the row unit and or to be cambered (e.g., oriented at a camber angle) relative to the soil surface. The linkage also enables the closing discs to maintain the toe angle and or the camber angle as the agricultural implement travels across a field. For example, if the closing discs encounter an obstruction in the soil, the closing discs may move substantially vertically within the closing discs' range of motion, while maintaining the toe angle and/or the camber angle. Thus, the disclosed embodiments enable consistent and effective closing of seed trenches, thereby improving growing conditions and increasing yields.

Figure 1:
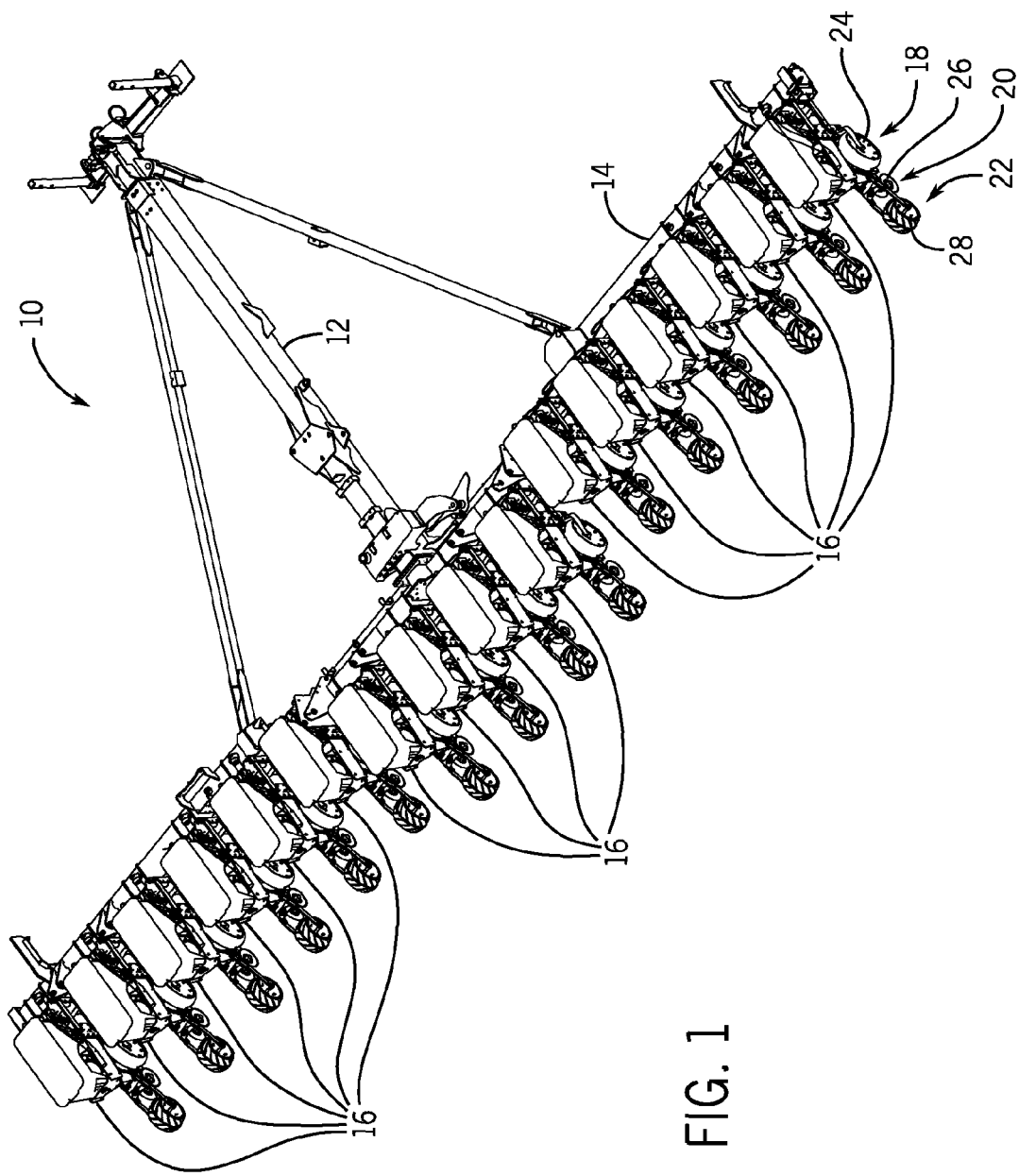
FIG. 1 is a perspective view of an embodiment of an agricultural implement having multiple row units configured to deposit seeds into soil, each row unit having a closing assembly for moving the soil over the deposited seeds.

Turning now to the drawings, FIG. 1 is a perspective view of an embodiment of an agricultural implement 10 configured to deposit seeds into a soil surface. The agricultural implement 10 is configured to be towed behind a work vehicle, such as a tractor or other prime mover. The agricultural implement 10 includes a tow bar assembly 12 which is arranged in the form of an A-frame hitch assembly. The tow bar assembly 12 may include a hitch to attach the agricultural implement 10 to an appropriate tractor hitch via a ball, clevis, or other coupling. The tow bar assembly 12 is coupled to a tool bar 14, which supports one or more seeding implements or row units 16. As discussed in detail below, each of the row units 16 is configured to deposit seeds at a desired depth beneath the soil surface, thereby establishing rows of planted seeds.

As shown, each of the row units 16 includes an opening assembly 18, a closing assembly 20, and a packer assembly 22. In the present configuration, the opening assembly 18 includes a gauge wheel 24 and an opener disc. The gauge wheel 24 may be positioned a vertical distance above the opener disc to establish a desired trench depth for seed deposition into the soil while the opener disc and the gauge wheel 24 are engaged with the soil. As the row unit travels across a field, the opener disc excavates a trench into the soil for seed deposition. A seed tube, which may be positioned behind the opening disc, directs seeds from a metering system into the excavated trench. As shown, the closing assembly 20 includes a pair of closing discs 26. The closing discs 26 direct the excavated soil into the trench to cover the planted seeds, and a packer wheel 28 of the packer assembly 22 then packs the soil on top of the deposited seeds. The planting process establishes a row of planted seeds within a field. By employing multiple row units 16 distributed along the tool bar 14, as shown in FIG. 1, multiple rows of seeds may be planted within the field.

While the illustrated agricultural implement 10 includes 16 row units 16, it should be appreciated that alternative implements may include more or fewer row units 16. For example, certain agricultural implements 10 may include 4 to 54 row units, or more. In addition, the spacing between row units 16 may be particularly selected based on the type of crop being planted. For example, the row units 16 may be spaced 30 inches from one another for planting corn, and 15 inches from one another for planting soy beans.

As previously mentioned, each of the one or more row units 16 may include the closing assembly 20 having the pair of closing discs 26 configured to direct the displaced soil over the seeds deposited within the trench created by the opening disc. As discussed in more detail below, each of the pair of closing discs 26 is oriented at a desired toe angle relative to the direction of travel of the agricultural implement 10 and/or a desired camber angle relative to the soil surface to enable the closing discs 26 to effectively move soil into the trench over the seeds. As the agricultural implement 10 travels through the field, a linkage assembly extending between a support structure and the closing discs 26 enables the closing discs 26 to move vertically and or rearwardly due to various disruptions in the soil (e.g., plant matter, rocks, clay, etc.). The linkage assembly is also configured to maintain the desired toe angle and/or the desired camber angle as the closing discs 26 move within a range of motion. As a result, the uniformity of the soil along the trench may be enhanced, thereby resulting in more even plant growth and greater crop yield.

Figure 2:
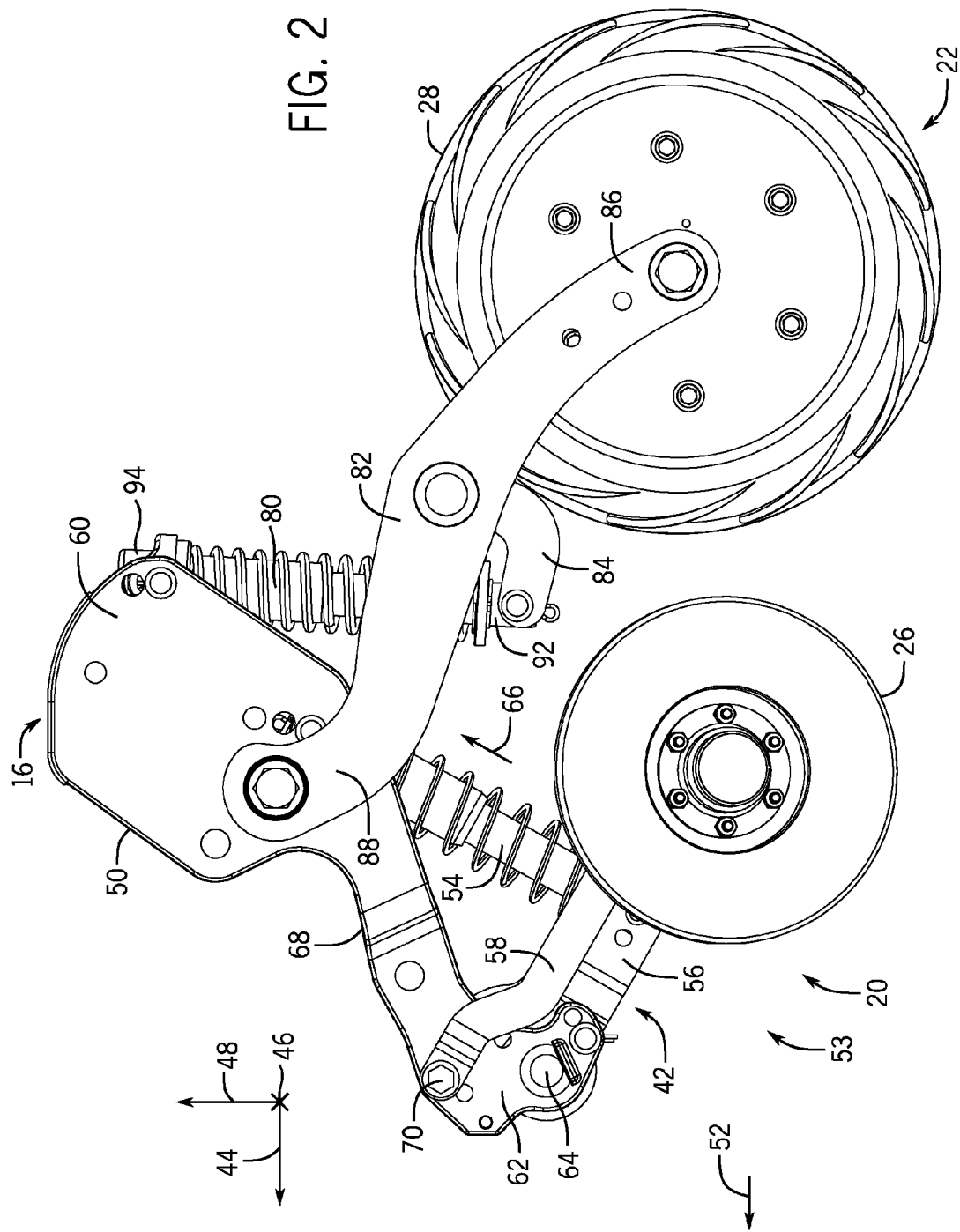
FIG. 2 is a side view of an embodiment of a portion of a row unit that may be used in the agricultural implement of FIG. 1, having a closing assembly with a linkage assembly.

FIG. 2 is a side view of an embodiment of a portion of one row unit 16 having the closing assembly 20 with a linkage assembly 42. The row unit 16 may be described with reference to an axial axis or direction 44, a lateral axis or direction 46, and a vertical axis or direction 48. A support structure 50 that is configured to be coupled to a frame of the row unit 16 supports the closing assembly 20 and the packer assembly 22. The closing assembly 20 includes the closing discs 26, which are configured to be positioned aft of the seed tube along the axial direction 44 relative to a direction of travel 52 of the row unit 16. In the illustrated embodiment, the closing discs 26 are in a lowered position 53 (e.g., extended position). As discussed in more detail below, the closing discs 26 are configured to move generally upwardly (e.g., along the vertical axis 48) and/or generally rearwardly (e.g., along the axial axis 44) from the lowered position 53 to a raised position in response to contact between the closing discs 26 and an obstacle or a variation in the soil surface as the row unit 16 travels across the field.

As shown, the closing assembly 20 includes the pair of closing discs 26, a first biasing assembly 54 (e.g., a closing assembly biasing assembly), and the linkage assembly 42 having a pair of first arms 56 and a pair of second arms 58. The first biasing assembly 54 extends between and is coupled to each of the pair of first arms 56 and an upper region 60 of the support structure 50. The first biasing assembly 54 urges the closing discs 26 in a generally downward direction (e.g., along the vertical axis 48) and/or in a generally forward direction (e.g., along the axial axis 44) toward the soil surface. Each of the pair of first arms 56 extends between and is coupled to a lower region 62 of the support structure 50 and a coupling (shown in FIGS. 3-5) that supports the closing discs 26. As shown, each of the pair of first arms 56 is rotatably mounted to the support structure 50 via a first pivot 64. The pair of first arms 56 generally supports the closing discs 26 and facilitates generally upward and/or rearward movement of the closing discs 26 relative to the support structure 50, as shown by arrow 66.

Each of the pair of second arms 58 extends between and is coupled to an intermediate region 68 of the support structure 50 and the coupling (shown in FIGS. 3-5) that supports the closing discs 26. Each of the pair of second arms 58 is rotatably mounted to the support structure 50 via a second pivot 70. The pair of second arms 58 generally supports the closing discs 26, which may be toed outwardly (e.g., oriented at a toe angle) relative to a direction of travel of the row unit andor to be cambered (e.g., oriented at a camber angle) relative to the soil surface. The pair of second arms 58 also enables the toe angle and/or the camber angle to be maintained as the closing discs 26 move within a range of motion relative to the support structure 50, as discussed in more detail below. It should be understood that the closing assembly 20 may include any suitable number of closing discs 26, such as 1, 2, 3, 4, or more closing discs 26, for example. Additionally, the closing discs 26 may be aligned laterally across the row unit 16 as shown, or the closing discs 26 may be staggered or offset from one another along the axial axis 44. In some embodiments, the pair of first arms 56 and the pair of second arms 58 may have any suitable form for supporting the closing discs 26, while enabling the toe angle and the camber angle of the closing discs 26 to be maintained as the closing discs 26 move within their range of motion relative to the support structure 50. For example, in some embodiments, rather than a pair of first arms 56, a single first arm may extend from the support structure 50 to the coupling.

In the illustrated embodiment, the packer assembly 22 having the packer wheel 28 is positioned aft of the closing discs 26 along the axial direction 44 relative to the direction of travel 52 of the row unit 16. The packing assembly 22 also includes a second biasing assembly 80 (e.g., a packing assembly biasing member), a pair of packer wheel support arms 82, and an anchor 84. The packing wheel 28 is rotatably mounted between respective first ends 86 of the packer wheel support arms 82. Respective second ends 88 of the packer wheel support arms 82 are rotatably coupled to the intermediate portion 68 of the support structure 50. The second biasing assembly 80 has a first end 92 coupled to the anchor 84 and a second end 94 coupled to the upper portion 60 of the support structure 50. The anchor 84 is coupled to the first end 92 of the second biasing assembly 80 and to the packer wheel support arms 82, thereby enabling the second biasing assembly 80 to urge the packer wheel 28 in a generally downward direction along the vertical axis 48 toward the soil surface. The illustrated embodiment is not intended to be limiting, and the packer assembly 22 may have any suitable configuration for packing the soil over the deposited seeds.

Figure 3:
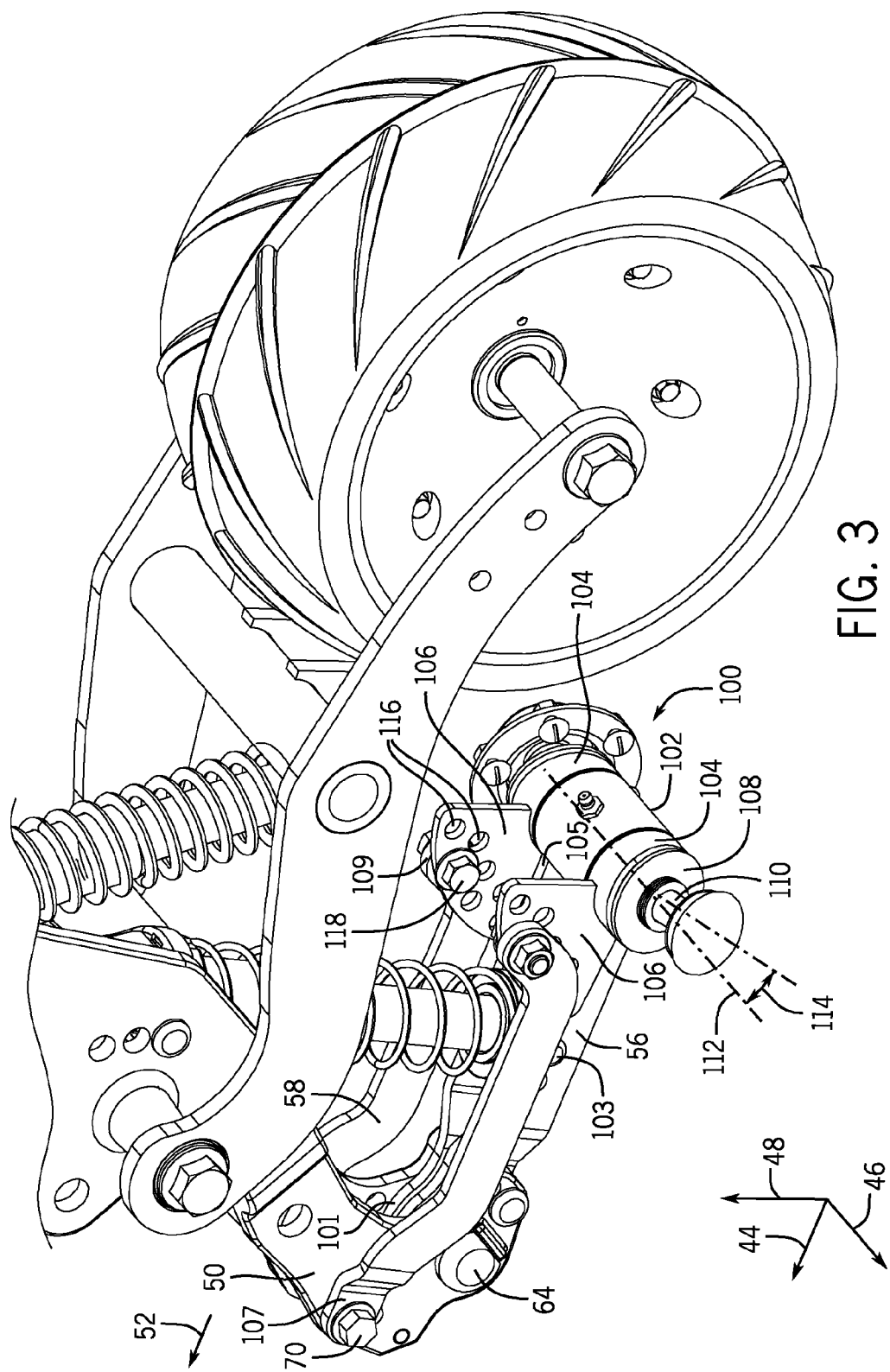
FIG. 3 is a perspective view of a portion of the row unit of FIG. 2.

FIG. 3 is a perspective view of a portion of the row unit 16 of FIG. 2. The closing discs 26 are removed for clarity. As shown, the linkage assembly 42 includes the pair of first arms 56, the pair of second arms 58, and a coupling 100 (e.g., axle). Each of the first arms 56 extends from the first pivot 64 to a center portion 102 (e.g., hub) of the coupling 100. In particular, each of the first arms 56 includes a first end 101 that is rotatably coupled to the support structure 50 via the first pivot 64 and a second end 105 that is non-rotatably coupled to the hub 102 of the coupling 100. As shown, the first biasing assembly 54 is secured to the pair of first arms 56 by a pin 103, although in other embodiments, the first biasing assembly 54 may be secured to the pair of first arms 56 via any suitable mechanism. Each of the second arms 58 extends from the second pivot 70 to respective outer portions 104 (e.g., caps) of the coupling 100. In particular, each of the second arms 58 includes a first end 107 that is rotatably coupled to the support structure 50 via the second pivot 70 and a second end 109 that is coupled to a bracket 106 of the respective cap 104. In certain embodiments, the second end 109 is rotatably coupled to the bracket 106.

As shown, a laterally outer surface 108 of the cap 104 is oriented at an angle relative to a longitudinal axis 112 of the hub 102. The laterally outer surface 108 is generally perpendicular to an angled disc mounting shaft 110 that extends laterally outward from the cap 104. The angled disc mounting shaft 110 extends laterally outward from the cap at an angle relative to the longitudinal axis 112 of the hub 102. For example, as shown, the angled disc mounting shaft 110 is oriented at a shaft angle 114 relative to the longitudinal axis 112. The shaft angle 114 may be between 5-75 degrees, 10-60 degrees, 15-45 degrees, or 20-30 degrees, or any other suitable angle. Thus, in the illustrated embodiment, the laterally outer surface 108 and the angled disc mounting shaft 110 are also oriented at an angle (e.g., a toe angle) relative to the direction of travel 52. As discussed in more detail below, the laterally outer surface 108 and the angled disc mounting shaft 110 may also be oriented at an angle (e.g., a camber angle) relative to the soil surface.

The angled disc mounting shaft 110 is configured to rotatably support the closing discs 26. Thus, the closing discs 26 may also be oriented at the toe angle relative to the direction of travel 52 and/or the camber angle relative to the soil surface. The toe angle and/or the camber angle may enable the closing discs 26 to effectively move soil over the seeds deposited in the trench. The linkage assembly 42 facilitates maintenance of the toe angle and/or the camber angle between the closing discs 26 as the row unit 16 travels through the field, thereby enabling the closing discs 26 to consistently and effectively move soil over the seeds deposited in the trench. In particular, the caps 104 are configured to rotate relative to the hub 102 as the closing discs 26 move within their range of motion. Rotation of the caps 104 drives the rotational axis of the closing discs 26 to revolve about the longitudinal axis 112 of the hub 102, thereby maintaining the toe angle and/or the camber angle of the closing discs 26 relative to the direction of travel 52 and/or the soil surface.

In certain embodiments, the desired toe angle and/or the desired camber angle of the closing discs 26 may vary based on soil conditions, type of seeds being planted, or the like. To enable adjustment of the toe angle and/or the camber angle of the closing discs 26, each bracket 106 includes multiple openings 116 (e.g., holes) configured to receive respective attachment elements 118 to couple the second end 109 of each of the second arms 58 to the bracket 106, as shown. For example, to attach the second arms 58 to the various openings 116, the bracket 106, the cap 104, and a rotational axis of the closing discs 26 revolve around the longitudinal axis 112 of the hub 102, and the toe angle and/or the camber angle is thereby adjusted. For example, an operator may wish to set the closing discs 26 at a desired toe angle and/or a desired camber angle based on soil conditions. In such cases, prior to planting operations, the operator may couple the second end 109 of each of the second arms 58 to a particular opening 116 to achieve the desired toe angle and/or camber angle of the closing discs 26. Once the desired toe angle and/or camber angle of the closing discs 26 is set (e.g., by coupling the second end 109 of each of the pair of second arms 58 to the bracket 106 via the bolts 118), the linkage assembly 42 enables the desired toe angle and/or camber angle to be maintained as the closing discs 26 move within their range of motion as the row unit 16 travels through the field.

Figure 4:
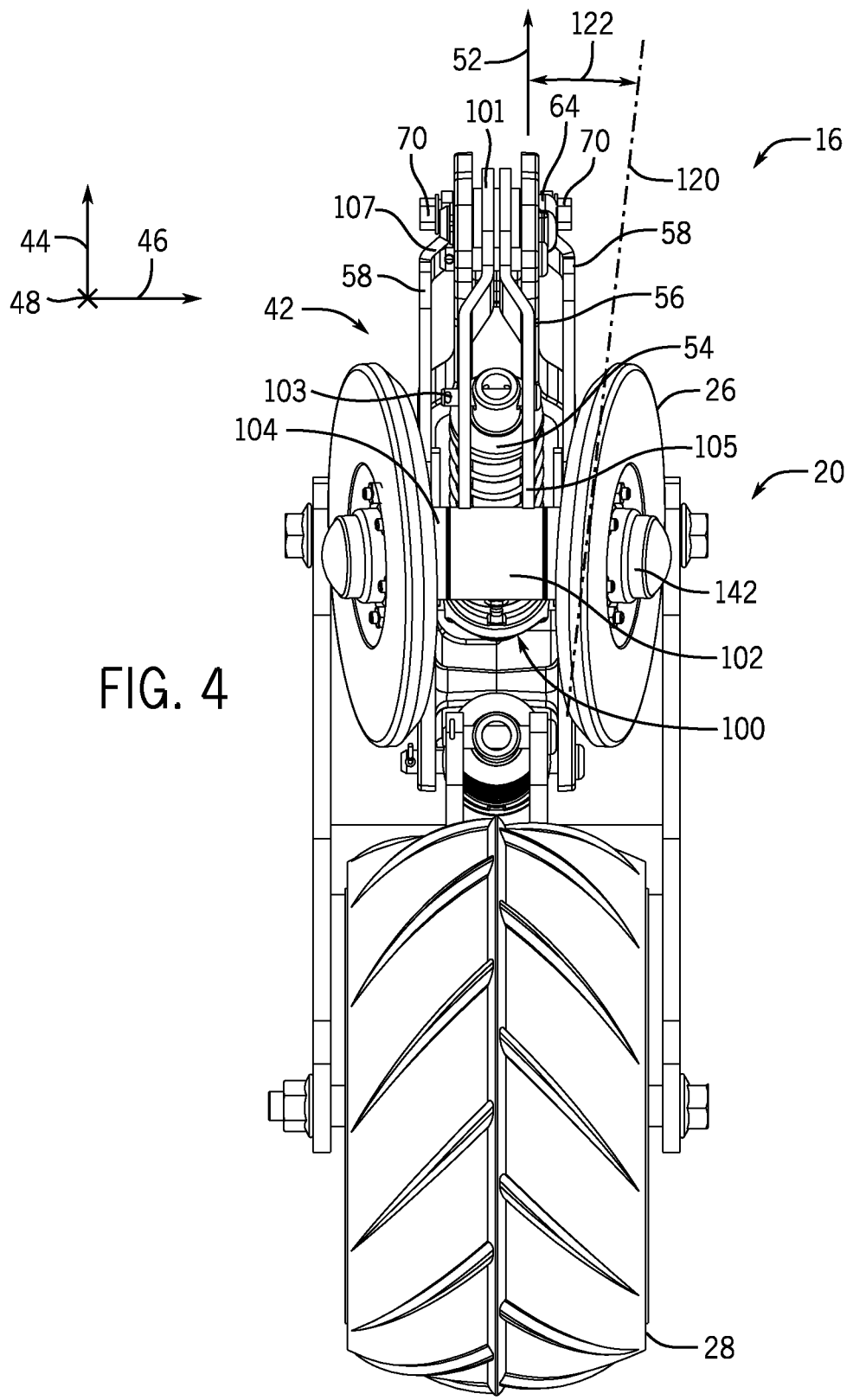
FIG. 4 is a bottom view of a portion of the row unit of FIG. 2.

FIG. 4 is a bottom view of a portion of the row unit 16 of FIG. 2. Each of the first arms 56 includes the first end 101 that is rotatably coupled to the support structure 50 via the first pivot 64 and the second end 105 that is non-rotatably coupled to the hub 102 of the coupling 100. The first biasing assembly 54 is secured to the pair of first arms 56 by the pin 103. Additionally, each of the second arms 58 includes the first end 107 that is rotatably coupled to the support structure 50 via the second pivot 70 and the second end 109 (shown in FIG. 3) that is coupled (e.g., rotatably) to the bracket 106 of the respective cap 104.

As noted above, the angled disc mounting shaft 110, as well as the closing discs 26 mounted thereon, is toed outwardly relative to the direction of travel 52. In particular, a rotational axis 120 of the closing discs 26 is oriented at a toe angle 122 relative to the direction of travel 52 and/or relative to the axial axis 44 of the row unit 16. In certain embodiments, the toe angle 122 is adjustable (e.g., prior to planting operations) by revolving each of the caps 104 and its respective closing disc 26 about the longitudinal axis 112 of the hub 102 and coupling the second end 109 of the respective second arm 58 to a desired opening 116 in the bracket 106 of the cap 104. The linkage assembly 42 is configured to facilitate maintenance of the toe angle 122 as the closing discs 26 move within their range of motion.

Figure 5:
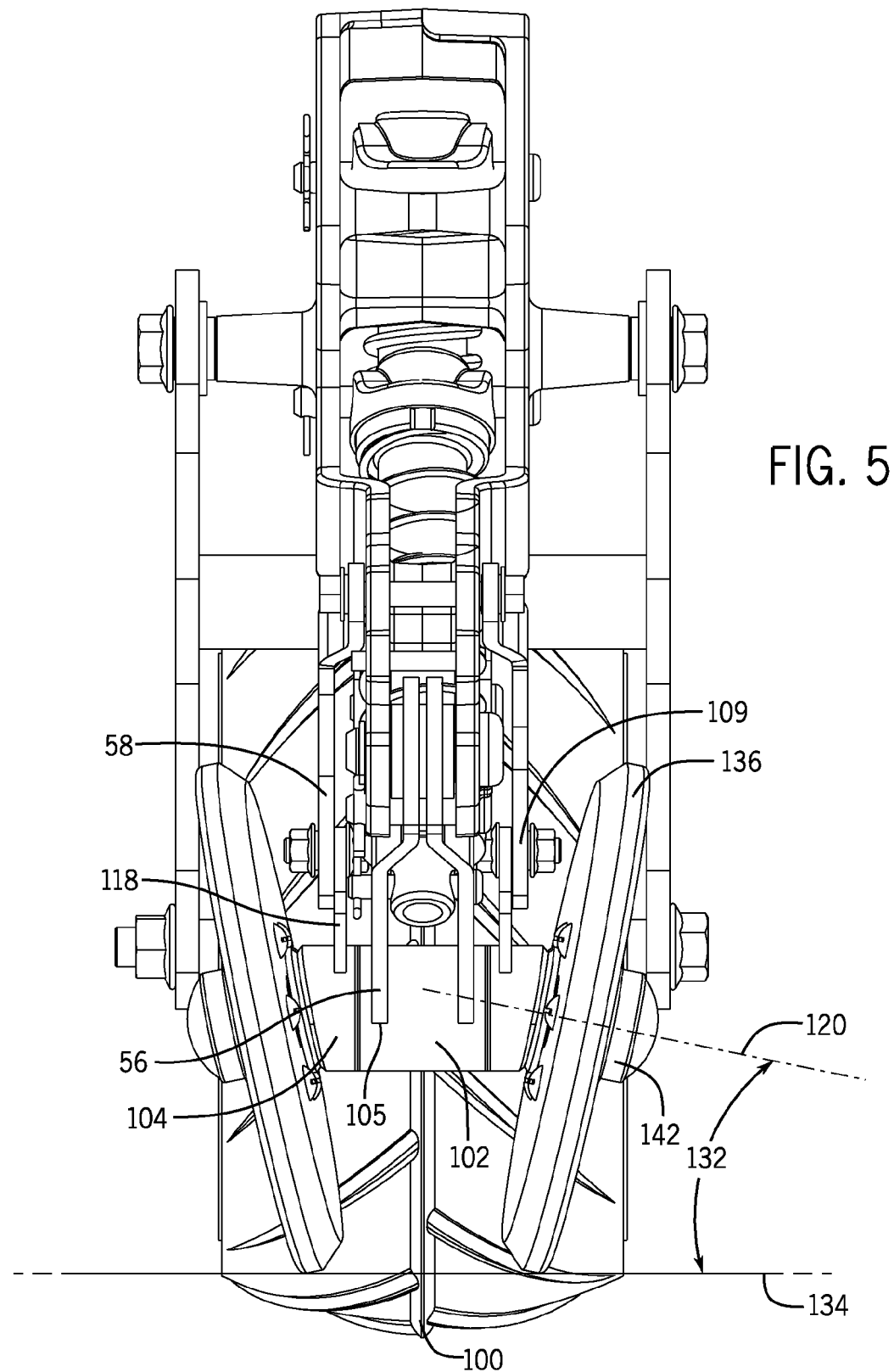
FIG. 5 is a front view of the closing assembly of the row unit of FIG. 2.

FIG. 5 is a front view of a portion of the row unit 16 of FIG. 2. As shown, each of the first arms 56 includes the second end 105 that is non-rotatably coupled to the hub 102, and each of the second arms 58 includes the second end 109 that is coupled (e.g., rotatably) to the bracket 106 of the respective cap 104. The closing discs 26 are also mounted to the respective caps 104 via the respective angled disc mounting shafts 110. In the illustrated embodiment, the rotational axis 120 of each closing disc 26 is oriented at a camber angle 132 relative to a soil surface 134 of the field. Thus, a top portion 136 of each closing disc 26 is cambered away from the coupling 100. In certain embodiments, the camber angle 132 is adjustable (e.g., prior to planting operations) by revolving each of the caps 104 and its respective closing disc 26 about the longitudinal axis 112 of the hub 102 and coupling the second end 109 of the respective second arm 58 to a desired opening 116 in the bracket 106 of the cap 104. The linkage assembly 42 is configured to facilitate maintenance of the camber angle 132 as the closing discs 26 move within their range of motion.

Figure 6:
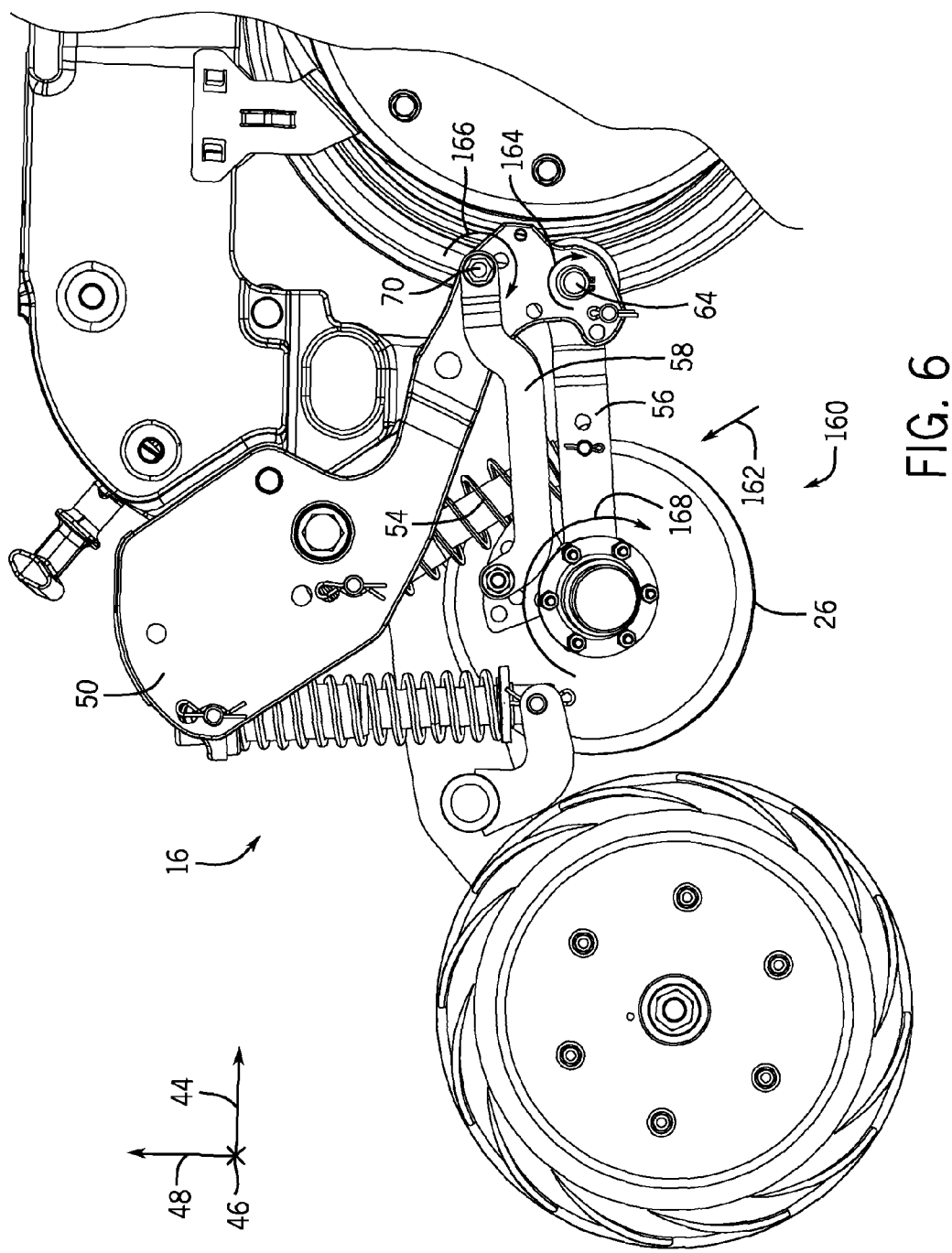
FIG. 6 is a side view of the closing assembly of FIG. 2 with closing discs in a raised position.

FIG. 6 is a side view of a portion of the row unit 16 with the closing discs 26 in a raised position 160 (e.g., compressed position). As noted above, FIG. 2 is a side view of the closing discs 26 in the lowered position 53. During planting operations, the closing discs 26 may occasionally move generally vertically and/or rearwardly as shown by arrow 162 (e.g., upon encountering an obstruction) from the lowered position 53 to the raised position 160. In particular, upon contact between the closing discs 26 and an obstruction, the first biasing assembly 54 may compress and the first pair of arms 56 may rotate about the first pin 64, as shown by arrow 164, as the closing discs 26 move upwardly relative to the support structure 50. Additionally, the second pair of arms 58 may rotate about the second pin 70, as shown by arrow 166. As the closing discs 26 move within their range of motion, the cap 104 rotates relative to the hub 102 of the coupling 100, as shown by arrow 168. Rotation of the cap 104 drives the rotational axis 120 of the closing discs 26 to revolve about the longitudinal axis 112 of the hub 102, thereby maintaining the toe angle 122 and/or the camber angle 132 of the closing discs 26 relative to the direction of travel 52 and/or the soil surface. The disclosed embodiments therefore enable the closing discs 26 to consistently and effectively move soil over the seeds deposited in the trench.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A row unit for an agricultural implement comprising:
   at least one closing disc configured to move soil into a trench;
   a coupling configured to support the at least one closing disc;
   a first arm having a first end coupled to a center portion of the coupling and a second end configured to rotatably couple to a support structure of the row unit; and
   a second arm having a first end rotatably coupled to an outer portion of the coupling and a second end configured to rotatably couple to the support structure of the row unit, wherein the outer portion of the coupling includes a bracket having a plurality of openings, and each opening of the plurality of openings is configured to receive an attachment element to rotatably couple the first end of the second arm to the bracket, wherein the outer portion of the coupling is rotatable relative to the center portion of the coupling, and rotation of the outer portion relative to the center portion drives a rotational axis of the at least one closing disc to revolve about a longitudinal axis of the center portion to enable the at least one closing disc to maintain a desired toe angle relative to a direction of travel or a desired camber angle relative to a surface of the soil as the row unit travels across a field.

2. The row unit of claim 1, wherein the first end of the first arm is non-rotatably coupled to the center portion of the coupling.

3. The row unit of claim 1, wherein the at least one closing disc is oriented at a first toe angle relative to the direction of travel when the first end of the second arm is coupled to a first opening of the plurality of openings, and the at least one closing disc is oriented at a second toe angle different from the first toe angle relative to the direction of travel when the first end of the second arm is coupled to a second opening of the plurality of openings.

4. The row unit of claim 1, comprising an angled disc mounting shaft configured to rotatably support the at least one closing disc on the coupling, wherein the angled disc mounting shaft extends from the outer portion of the coupling at an angle relative to a longitudinal axis of the center portion of the coupling.

5. The row unit of claim 4, wherein the angled disc mounting shaft is toed outwardly relative to the direction of travel of the row unit.

6. The row unit of claim 1, comprising an angled disc mounting shaft configured to rotatably support the at least one closing disc on the coupling, wherein the angled disc mounting shaft extends from the outer portion of the coupling at an angle relative to the surface of the soil.

7. The row unit of claim 1, comprising a pair of closing discs disposed on opposite lateral ends of the coupling.

8. A row unit for an agricultural implement comprising:
   a support structure;
   a closing disc coupled to the support structure, wherein the closing disc is configured to be positioned aft of an opener disc and to move soil into a trench formed by the opener disc as the agricultural implement travels across a field;
   a linkage assembly coupled to the support structure, the linkage assembly comprising:
   a coupling having a center portion and an outer portion;

a plurality of support arms extending between the support structure and the coupling, the plurality of support arms comprising
  a first arm having a first end rotatably coupled to the support structure and a second end non-rotatably coupled to the center portion of the coupling;
  a second arm having a first end rotatably coupled to the support structure and a second end coupled to the outer portion of the coupling, wherein the second end of the second arm is rotatably coupled to a bracket of the outer portion, and the bracket comprises a plurality of openings each configured to receive an attachment element to rotatably couple the second end of the second arm to the bracket; and
an angled disc mounting shaft extending laterally outward from the outer portion of the coupling at an angle relative to a longitudinal axis of the coupling, wherein the closing disc is rotatably mounted on the angled disc mounting shaft, and the outer portion and the angled disc mounting shaft are configured to rotate relative to the center portion of the coupling to maintain a desired angular relationship between the closing disc and a surface of the soil as the agricultural implement travels across a field.

9. The row unit of claim 8, wherein the closing disc is oriented at a first camber angle relative to the surface of the soil when the second end of the second arm is coupled to a first opening of the plurality of openings, and the closing disc is oriented at a second camber angle different from the first camber angle relative to the surface of the soil when the second end of the second arm is coupled to a second opening of the plurality of openings.

10. A row unit for an agricultural implement comprising:
a support structure configured to be coupled to a frame of the row unit;
a closing assembly, comprising:
  a coupling having a center portion and an outer portion;
  a closing disc configured to move soil into a trench, wherein the closing disc is supported by the outer portion of the coupling and is oriented at an angle relative to a longitudinal axis of the center portion of the coupling;
  a first support arm extending between the support structure and the center portion of the coupling; and
  a second support arm extending between the support structure and the outer portion of the coupling, the second support arm including a first end that is rotatably coupled to the support structure and a second end that is coupled to the outer portion of the coupling, wherein the second support arm is rotatably coupled to a bracket of the outer portion, and the bracket comprises a plurality of openings each configured to receive an attachment element to rotatably couple the second end of the second support arm to the bracket, and
  wherein the outer portion is configured to rotate relative to the center portion in response to movement of the closing disc vertically upward away from a surface of a field to maintain the angle between the closing disc and the longitudinal axis of the center portion of the coupling.

11. The row unit of claim 10, wherein the first support arm includes a first end that is rotatably coupled to the support structure and a second end that is non-rotatably coupled to the center portion of the coupling.

12. The row unit of claim 10, wherein the closing disc is oriented at a first angle relative to the longitudinal axis of the center portion of the coupling when the second end of the second arm is coupled to a first opening of the plurality of openings, and the closing disc is oriented at a second angle different from the first angle relative to the longitudinal axis of the center portion of the coupling when the second end of the second arm is coupled to a second opening of the plurality of openings.

13. The row unit of claim 10, wherein the closing disc is toed outwardly relative to the direction of travel of the row unit and is cambered relative to a surface of the soil.

* * * * *